United States Patent [19]
Abou-Sayed et al.

[11] Patent Number: 4,832,123
[45] Date of Patent: May 23, 1989

[54] REMOVING FRACTURE FLUID VIA CHEMICAL BLOWING AGENTS

[75] Inventors: Ibrahim S. Abou-Sayed, Plano; Randy D. Hazlett, Dallas, both of Tex.

[73] Assignee: Mobil Oil Corp., New York, N.Y.

[21] Appl. No.: 150,587

[22] Filed: Feb. 1, 1988

[51] Int. Cl.$^4$ .............................................. E21B 43/26
[52] U.S. Cl. ................................... 166/281; 166/300; 166/308; 252/8.551
[58] Field of Search ............... 166/281, 300, 308, 312; 252/8.551

[56] References Cited

U.S. PATENT DOCUMENTS

| | | | |
|---|---|---|---|
| 2,943,681 | 7/1960 | Barrett | 166/308 X |
| 3,529,666 | 9/1970 | Crowe | 166/300 |
| 3,818,990 | 6/1974 | Coulter | 166/281 X |
| 4,008,769 | 2/1977 | Chang | 166/274 |
| 4,219,083 | 8/1980 | Richardson et al. | 166/300 |
| 4,232,741 | 11/1980 | Richardson et al. | 166/281 |
| 4,450,010 | 5/1984 | Burkhalter et al. | 166/293 X |
| 4,464,268 | 8/1984 | Schievelbein | 166/312 X |
| 4,609,475 | 9/1986 | Hanlon et al. | 166/312 X |
| 4,610,795 | 9/1986 | Norris et al. | 166/308 X |
| 4,705,810 | 11/1987 | Millet et al. | 521/86 |

Primary Examiner—George A. Suchfield
Attorney, Agent, or Firm—Alexander J. McKillop; Charles J. Speciale; Charles A. Malone

[57] ABSTRACT

A method for increasing the efficiency by which fracture fluids are produced back from a hydrocarbonaceous fluid bearing formation. To remove said fracture fluid, a chemical blowing agent is placed into the formation. After placement of said blowing agent and fracturing the formation, the blowing agent decomposes thereby either causing the filter cake to become more porous or providing a driving force for fluid load removal from the matrix. Increased porosity enhances communication between the formation and the fracture, thus increasing the efficiency of fracture fluid production. Gas liberation within the matrix establishes communication pathways for subsequent removal of hydrocarbonaceous fluids by displacing fluid loads into the fracture and the well.

26 Claims, No Drawings

REMOVING FRACTURE FLUID VIA CHEMICAL BLOWING AGENTS

FIELD OF THE INVENTION

This invention is related to methods for removing a residual drive fluid from a subterranean formation.

BACKGROUND OF THE INVENTION

Once the natural driving force has been depleted oil or hydrocarbonaceous fluids must be removed from a formation via enhanced oil recovery methods. Some of these enhanced oil recovery methods where fracturing is employed utilize foams, gels, water, or other fluids which can also damage the formation and impede the recovery of hydrocarbonaceous fluids. Indeed, some of these fluids (fracture fluid load) can cause permanent damage to a formation. Once fracture fluid has served its purpose, it is necessary to remove it to continue producing hydrocarbonaceous fluids from the formation.

Therefore, what is needed is a method to remove a fracture fluid load from a formation in an efficient and effective manner.

SUMMARY

This invention is directed to a method for removing a fluid load from a formation following a fracturing treatment. To remove said fluid load a chemical blowing agent is placed in said formation in an amount sufficient to create gas at a rate and volume sufficient upon decomposition thereof to move said fracturing fluid through said formation. After supplying said blowing agent to the formation, said formation is shut in. Said chemial blowing agent is then caused to decompose. Upon decomposition said blowing agent liberates gas at a rate and volume sufficient to energize said fluid load thereby causing a substantial increase in the speed of fracture fluid removal from said formation.

It is therefore an object of this invention to generate a gas in-situ to facilitate the removal of a fracture fluid from a formation.

It is another object of this invention to efficiently remove a fracture fluid from a formation to minimize formation damage.

It is yet another object of this invention to reduce the cost and time for removal of a fracture fluid from a formation.

It is still another object of this invention to provide an effective method for removing and reclaiming materials used in a formation fluid drive.

It is a still yet further object of this invention to remove a fracture fluid from a hydrocarbonaceous gaseous reservoir.

PREFERRED EMBODIMENTS

In the practice of this invention, a chemical blowing agent is placed in a formation during a fracturing operation. The chemical blowing agent can be placed into the formation solubilized in an aqueous slug or unsolubilized in a dispersion. In a preferred embodiment, the chemical blowing agent is injected as a single phase. The medium employed by placing a chemical blowing agent into the formation will depend upon the chemical blowing agent utilized and the environment of the formation. The amount of chemical blowing agent utilized will of course depend upon factors including the agent employed, environment of the formation, composition of the formation, and the area of the formation desired to be treated. Although these factors will dictate the amount of blowing agent utilized, it is generally anticipated that the blowing agent utilized will vary from about 0.50 to about 5.0% by wt.

Upon entering the formation the chemical blowing agent is directed into the matrix of the formation where a fracture fluid has leaked-off following a fracturing operation. The chemical blowing agent can be selected to decompose because of the formation temperature or a pH change. Once decomposition has occurred, gas is liberated from the chemical blowing agent. Gas liberation within the reservoir forces the fracture fluid from the formation matrix into the fracture. After the fracture fluid has been removed, hydrocarbonaceous fluids can be produced from the formation more easily. This method can be used to remove fracture fluid from a formation from which hydrocarbonaceous liquids are produced. This method is particularly beneficial in a formation from which a hydrocarbonaceous gas is produced.

Decomposition of the chemical blowing agent can be controlled by incorporating pH buffers, accelerators, or inhibitors into the fracture fluid. Choice of accelerators or inhibitors would be specific to the selected blowing agent. Accelerators which can be used for the blowing agent azodicarbonamide include alkali carbonates, basic metal salts of lead, cadmium, or zinc such as dibasic lead phthalate, and polyols such as glycols and glycerol. Inhibitors which can be utilized include barium salts and neutral pH buffers. Accelerators which can be used for the blowing agent dinitrosopentamethylenetetramine (DNPT) include mineral acids and salts of mineral acids such as zinc chloride. Stabilizers which can be used for DNPT include oxides, hydroxides, or carbonates of calcium, barium, zinc, or magnesium. In this embodiment a quantity of the blowing agent sufficient to treat the desired area is incorporated into the fracturing fluid. The formation is then fractured. Upon decomposition of the chemical blowing agent, fracturing fluids which have entered the formation matrix are produced by liberated gas drive. In the case of a gas well, communication between reservoir fluids and the well which has been stimulated by fractures is established.

In a separate embodiment, a quantity of a chemical blowing agent insoluble in the fracturing fluid and formation fluids is placed into the fracturing fluid. While the fracture is propagating to the extent desired, often a filter cake, comprising gel material, formation fines, and particles, will form on the fracture face. This filter cake causes a resistance to the backflow of fracturing fluids which have entered the matrix and formation fluids from said matrix into fractures and the well. During the fracturing operation the desired insoluble blowing agent is prohibited from entering the formation matrix along with the fracturing fluid. When fracturing is completed, the chemical blowing agent is incorporated or lodged in the filter cake. When the formation conditions are such that decomposition of the chemical blowing agent occurs, gas is liberated thereby causing the filter cake to become porous.

An open-cell, porous filter cake enhances communication between the reservoir and the fracture, thus increasing the efficiency by which fracture fluids are produced from a formation or reservoir. A preferred insoluble chemical blowing agent for use herein is azodicarbonamide.

Azodicarbonamide is soluble in water only at elevated temperatures. Since azodicarbonamide is available in powder form with average particle size in the micron range, solid dispersion can be utilized. A dispersion can be made by placing micron-sized azodicarbonamide in a solution containing a suitable surfactant. The amount of azodicarbonamide should be sufficient to create the volume of gas required to create an open-celled structure. One such class of surfactants is the alkyl naphthalene sulfonates, which can be purchased from GAF Corp., located in New York, as the Nekal series. Should it be desired to accelerate the decomposition of azodicarbonamide, an alkali carbonate can be utilized to lower the decomposition temperature. Alkali carbonates which can be utilized include sodium carbonate and potassium carbonate. Thus, azodicarbonamide will prove to have enhanced potential for use in carbonate reservoirs. Azodicarbonamide can be included in a microemulsion for injection into the formation. A method for making a microemulsion is disclosed in U.S. Pat. No. 4,008,769 which issued to Chang on Feb. 22, 1977. This patent is incorporated by reference herein.

Chemical blowing agent formulations which can be utilized herein include dinitrosopentamethylenetetramine (DNPT), blends of sodium hydrogen carbonate and nitrogen releasing agents such as p-toluene sulfonyl hydrazide, and p,p'-oxybis (benzenesulfonyl hydrazide). Other chemical blowing agents which can be utilized include azodicarbonamide, and the sodium salt of azodicarboxylic acid.

DNPT and sodium hydrogen carbonate can be used in conjunction with fracturing fluid having an aqueous medium therein. Since DNPT is only slightly soluble in cold water, warm water is required to achieve significant water solubility. Solutions of about 0.5% DNPT by weight are readily obtainable at room temperature. Solutions exceeding about 1% by weight are obtainable at 45° C. Warm water can be obtained by preheating water to be injected or reinjecting warm produced water. Enhancement of the low temperature solubility of DNPT can be obtained by the use of chemicals. Said chemicals include dimethylformamide and dimethyl sulfoxide. As will be understood by those skilled in the art, the amount of chemical utilized will depend upon such factors as the amount and temperature of water utilized, chemical composition of the water, and the amount of DNPT utilized.

Although sodium hydrogen carbonate and other bicarbonate foaming agents can be utilized as water-soluble chemical blowing agents, they are limited by an equilibrium which reduces yield with increasing pressure. To overcome this limitation, bicarbonate decomposition can be pH driven with formulations containing suitable compounds for pH depression with temperature increase. One such compound is the nitrogen releasing blowing agent, p-toluene sulfonyl hydrazide. Bicarbonate decomposition generates carbon dioxide. The addition of a suitable amount of p-toluene sulfonyl hydrazide, which liberates acidic components upon decomposition, causes substantially increased volumes of carbon dioxide to be released from solution due to bicarbonate decomposition.

The sodium salt of azodicarboxylic acid can be used as a water soluble chemical blowing agent. This blowing agent can be formed on site by the treatment of azodicarbonamide with sodium hydroxide and alkali carbonate with resulting ammonia evolution. When heated, this salt liberates nitrogen and carbon dioxide, yet it is very stable at room temperature in basic solutions having a pH greater than 12. pH decline from hydroxide consumption will accelerate the foam decomposition reaction. Toluene sulfonyl hydrazide and p,p'-oxybis(benzene-sulfonyl hydrazide) also develop water solubility at high pH, but the modified azodicarbonamide is preferred.

Once decomposition of the blowing agent has occurred by either embodiment, the production of fracture fluid is enhanced. Increased porosity of the filter cake enhances the removal of the fluid load and formation fluids. Use of soluble chemical blowing agents which penetrate the matrix with leak off fluids yield a driving force for fluid load removal and communication re-establishment. Fracture fluids which can be removed include those commonly utilized in fracturing operations. These fluid loads include, but are not limited to, foams, gels, and gums. After removing the fluid load from the formation, hydrocarbonaceous fluids can be produced therefrom.

Obviously, many other variations and modifications of this invention as previously set forth may be made without departing from the spirit and scope of this invention as those skilled in the art readily understand. Such variations and modifications are considered part of this invention and within the purview and scope of the appended claims.

What is claimed:

1. A method for removing fracture fluid from a formation following a fracture treatment comprising:
   (a) injecting into the formation a chemical blowing agent in an amount sufficient upon decomposition of said agent to create gas at a rate and volume sufficient to remove a fracture fluid from said formation where said chemical blowing agent is a member selected from the group consisting of dinitrosopentamethylenetetramine, sodium hydrogen carbonate and p-toluene sulfonyl hydrazide, azodicarbonamide, and p,p'-oxybis(benzenesulfonyl hydrazide); and
   (b) causing said chemical blowing agent to decompose so that gas is liberated in an amount sufficient to remove said fracture fluid from the formation's matrix into a fracture thereby enhancing production of said fluid from said formation.

2. The method as recited in claim 1 where in step (b) said fracture fluid comprises a gel, a foam, or water.

3. The method as recited in claim 1 where a hydrocarbonaceous fluid is produced from the formation after step (b).

4. The method as recited in claim 1 where said chemical blowing agent is a formulation of sodium hydrogen carbonate and p-toluene sulfonyl hydrazide which decomposes to release nitrogen and carbon dioxide gases.

5. The method as recited in claim 1 where azodicarbonamide decomposition is accelerated by alkali carbonates.

6. The method as recited in claim 1 where azodicarbonamide is modified to form the sodium or potassium salt of azodicarboxylic acid which upon decomposition liberates nitrogen and carbon dioxide gases.

7. The method as recited in claim 1 where said blowing agent is contained in an aqueous slug which contains therein a pH adjustor, an accelerator, or an inhibitor.

8. The method as recited in claim 1 where said chemical blowing agent is placed in an aqueous slug in an amount of from about 0.5 to about 5 wt. percent.

9. The method as recited in claim 1 where said chemical blowing agent is placed into a microemulsion or a dispersion.

10. The method as recited in claim 1 where the fracture fluid is recovered and separated from hydrocarbonaceous fluids produced from said formation.

11. A method for enhancing removal of fracture fluid from a formation or reservoir comprising:
   (a) placing into a fracturing fluid a chemical blowing agent in an amount sufficient upon decomposition of said agent to create gas sufficient to remove said fracture fluid from said formation where said chemical blowing agent is a member selected from the group consisting of dinitrosopentamethylenetetramine, sodium hydrogen carbonate and p-toluene sulfonyl hydrazide, azodicarbonamide, and p,p'-oxybis(benzenesulfonyl hydrazide);
   (b) fracturing said formation and causing said chemical blowing agent to decompose after completion of said fracturing; and
   (c) completing said fracturing and decomposing said chemical blowing agent thereby liberating gas in an amount sufficient to remove said fracture fluid from the formation's matrix which enhances production of the fracture fluid from said formation.

12. The method as recited in claim 11 where in step (b) said fluid comprises a gel, a foam, or water.

13. The method as recited in claim 11 where this method is conducted in a gas containing formation of reservoir which facilitates gas production.

14. The method as recited in claim 11 where said chemical blowing agent is a formulation of sodium hydrogen carbonate and p-toluene sulfonyl hydrazide which decomposes to release nitrogen and carbon dioxide gases.

15. The method as recited in claim 11 where said chemical blowing agent is azodicarbonamide where decomposition is accelerated by alkali carbonates.

16. The method as recited in claim 11 where azodicarbonamide is modified to form the sodium sodium or potassium salt of azodicarboxylic acid which upon decomposition liberates nitrogen and carbon dioxide gases.

17. The method as recited in claim 11 where said blowing agent is contained in an aqueous slug which contains therein a pH adjustor, an accelerator, or an inhibitor.

18. A method for enhancing removal of fracture fluid from a formation or reservoir comprising:
   (a) placing into a fracturing fluid an insoluble chemical blowing agent in an amount sufficient upon decomposition of said agent, to create gas sufficient to form an open-cell structure within a filter cake at a fracture face in said formation;
   (b) fracturing said formation and causing said chemical blowing agent to decompose after completion of said fracturing; and
   (c) completing said fracturing and decomposing said chemical blowing agent thereby liberating gas in an amount sufficient to form an open-cell structure within the filter cake which enhances production of fluid load from said formation.

19. The method as recited in claim 18 where in step (b) said fracture fluid comprises a gel, a foam, or water.

20. The method as recited in claim 18 where said method is conducted in a gas containing formation or reservoir which facilitates gas production.

21. The method as recited in claim 18 where said chemical blowing agent is dinitrosopentamethylenetetramine.

22. The method as recited in claim 18 where said blowing agent is p-toluene sulfonyl hydrazide.

23. The method as recited in claim 18 where said chemical blowing agent is azodicarbonamide.

24. The method as recited in claim 18 where said chemical blowing agent is azodicarbonamide where decomposition is accelerated by alkali carbonates.

25. The method as recited in claim 18 where said chemical blowing agent is p,p'-oxybis(benzenesulfonyl hydrazide).

26. The method as recited in claim 18 where said blowing agent is contained in an aqueous slug which contains therein a pH adjustor, an accelerator, or an inhibitor.

* * * * *

UNITED STATES PATENT AND TRADEMARK OFFICE
CERTIFICATE OF CORRECTION

PATENT NO. : 4,832,123

DATED : May 23, 1989

INVENTOR(S) : Ibrahim S. Abou-Sayed et al

It is certified that error appears in the above-identified patent and that said Letters Patent is hereby corrected as shown below:

Column 1, line 35, delete "chemial" and insert --chemical--.

Column 5, line 31, delete "of" and insert --or--.

Signed and Sealed this

Twenty-seventh Day of February, 1990

*Attest:*

JEFFREY M. SAMUELS

*Attesting Officer*  *Acting Commissioner of Patents and Trademarks*